United States Patent Office 3,371,482
Patented Mar. 5, 1968

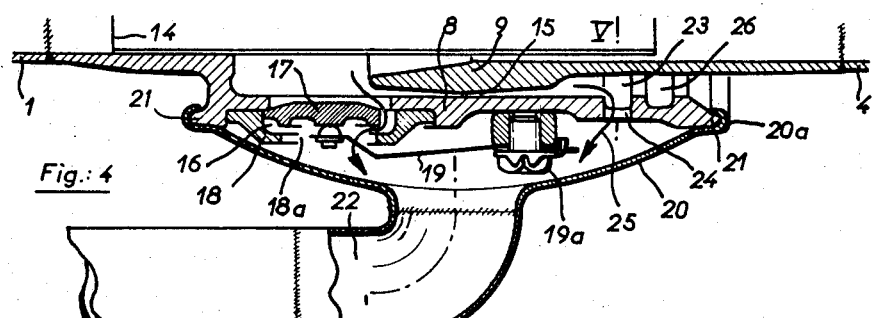
Fig.: 4
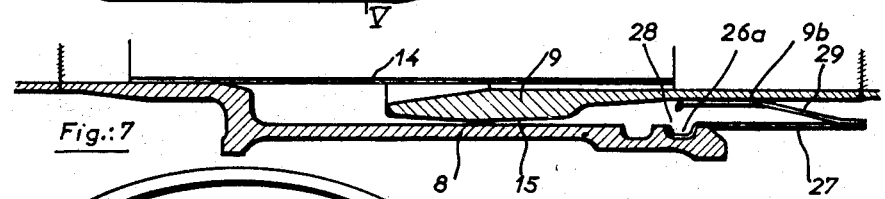
Fig.: 7
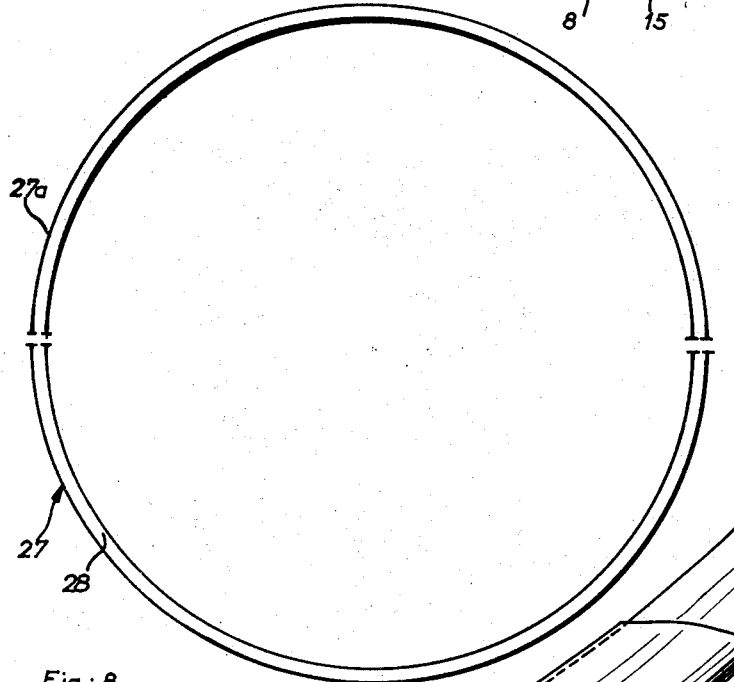
Fig.: 8
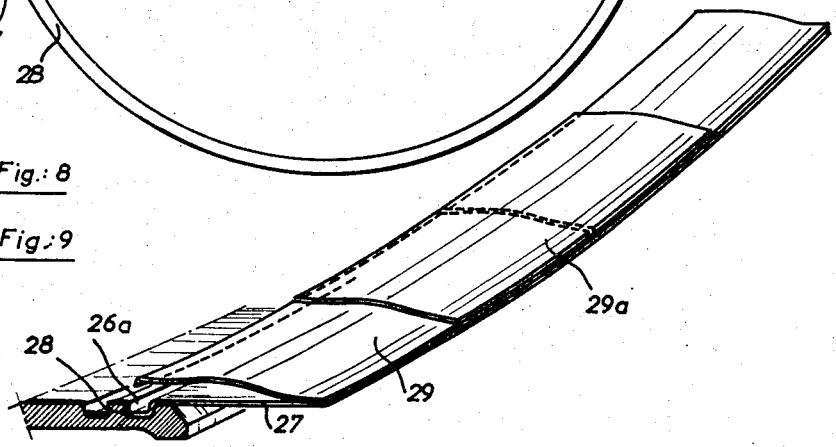
Fig.: 9

3,371,482
JET PROPULSION CASINGS HAVING FUEL DRAINAGE MEANS
André Alphonse Médéric Léon Camboulives, Billancourt, Seine, and Roger Alfred Jules Vandenbroucke, Antony, France, assignors to Societe Nationale d'Etude et de Construction de Moteurs d'Aviation, Paris, France, a company of France
Filed June 10, 1966, Ser. No. 556,613
Claims priority, application France, June 14, 1965, 20,686
10 Claims. (Cl. 60—39.32)

ABSTRACT OF THE DISCLOSURE

An articulated joint between ducts forming the joining elements of an outer casing for a jet propulsion unit, having fuel recovery means comprising a drainage orifice forming a valve seat in a lower portion of the female flange of the joint, a valve member which is applied against the seat by the pressure prevailing in the ducts when the unit is running, against the action of a biasing force, and a sump device for receiving liquid fuel flowing through the valve seat.

---

Figure 1:
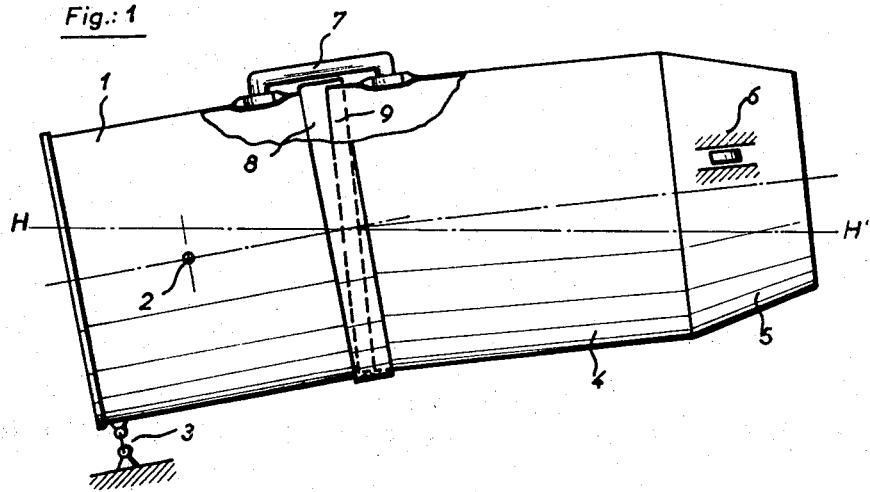

This invention relates to articulated joints between ducts, especially between the casing elements of jet propulsion units. More particularly, the invention is concerned with the draining of unused fuel and freedom from leakage of such ducts.

The accommodation of a jet engine in an aircraft's frame sometimes makes it necessary for the connection between the engine and the jet pipe, or between the latter and the nozzle, to be articulated. In some cases, the engine is attached to the airframe, independently of the jet pipe, by an isostatic suspension; the jet pipe, which may include an afterburner, being rigid with the nozzle and being on the one hand suspended at its rear and on the other hand centered on and coupled at its front to the rear of the engine by a semi-flexible articulation that comprises a deformable joint. In other cases, the engine and the nozzle are independent of one another, each being attached independently to the airframe by an isostatic suspension. Located between them, and centered at its front on the engine and at its rear on the nozzle, the jet pipe or afterburner pipe is coupled to the engine by a semiflexible articulation comprising a deformable joint, and another articulated or deformable joint is provided between the jet pipe and the nozzle.

The articulation of the jet pipe to the engine, or the articulations thereof to the engine and to the nozzle, allow for deformations inherent in the operation of the engine or in the flight of the aircraft generally without giving rise to disadvantages. The articulations comprise a joint, generally of the swivel type, which should ensure as perfect a freedom from leakage as possible in order to reduce leakage of gases. Such swivel joint, in its most simple form, comprises a male flange, a female flange and an internal flap which fills the role of a joint cover. Such a joint, operating at high temperatures of the order of 600° C. to 700° C., or even of 800° C., does not ensure complete freedom from leaks. In particular, upon the occurrence of an ignition failure, a quantity of fuel in its liquid state may pass by way of this joint. Such fuel may be drained off to the outside of the nacelle and recovered.

An object of the present invention is to provide improvements that will facilitate the draining off and recovery of unused fuel in its liquid state, and provide an improved tightness in respect of gas leakages.

In conformity with one feature of the present invention, there is arranged in the lower portion of the female flange, beyond the male flange, a drainage valve urged in the direction of opening, but closing under the action of the pressure prevailing inside the jet pipe and the engine after ignition.

According to another feature of the invention, a flexible sealing means is inserted between the end of the female flange and the wall of the part bearing the male flange. Such flexible sealing means lessens the area of leakage by pressing against such wall and such female flange in every position the swivel joint may occupy.

Such flexible sealing means is preferably constituted by an assembly of plates flexibly applied respectively against the female flange and against the wall associated with the male flange, and forming a concavity open to the space formed between the two flanges.

The following description, referring to the accompanying drawings and given by way of non-limitative example, will bring out the various features of the invention and the manner of putting them into effect, any arrangement emerging either from the text or from the drawings naturally falling within the scope of said invention.

Figure 6:
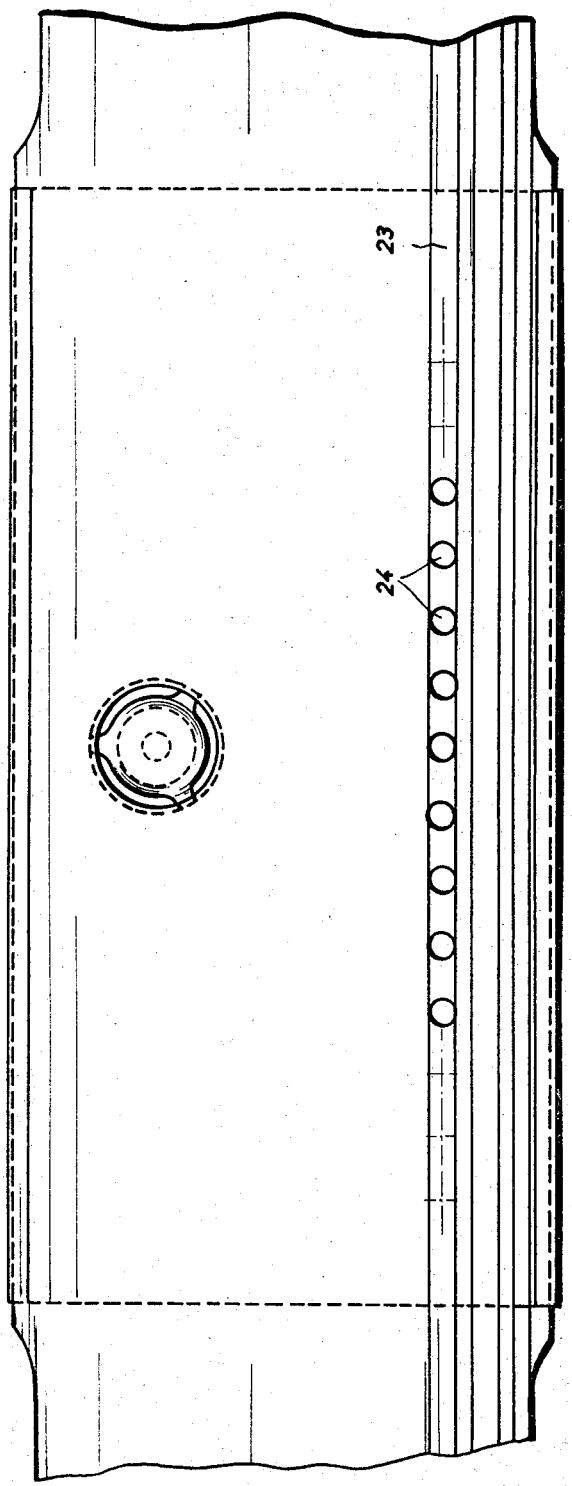
Figure 5:
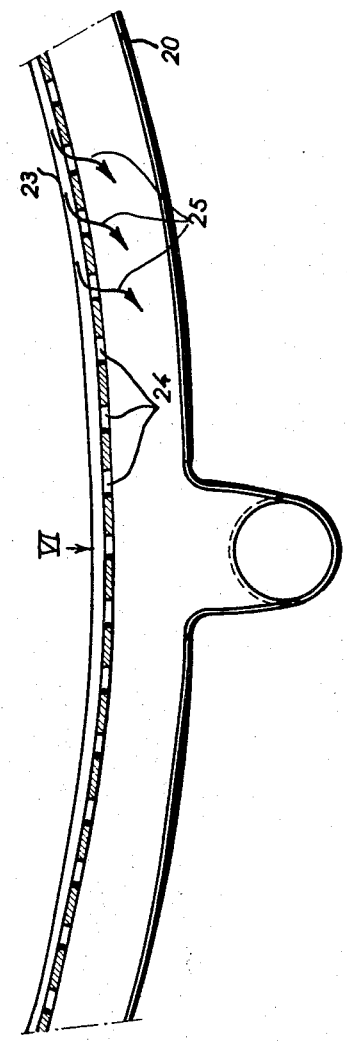

In the drawings:
FIG. 1 shows diagrammatically, in longitudinal elevation, a jet propulsion unit having a jet pipe which is rigid with the nozzle and is coupled to the rear of the engine,
FIG. 2 is a view analogous to that in FIG. 1, showing another arrangement in which the jet pipe is separately formed from the nozzle,
FIG. 3 is a longitudinal section, drawn to a larger scale, of the lower portion of the swivel joint between the engine and the jet pipe in FIG. 1 or FIG. 2, showing an already known arrangement of said joint,
FIG. 4 is a view, analogous to that in FIG. 3, showing a device for draining off and recovering liquid fuel,
FIG. 5 is a cross-section view on the broken line V—V in FIG. 4,
FIG. 6 is a plan view of the female flange appertaining to the swivel joint, looking in the direction of the arrow VI in FIG. 5, the male flange and the flap over the swivel joint having been removed,
FIG. 7 is a view, analogous to FIG. 3, showing a flexible sealing means which improves the leak tightness of the swivel joint,
FIG. 8 is an end view of the support of said flexible mating means, and
FIG. 9 is a perspective view showing the mounting of the flexible sealing means.

Figure 2:
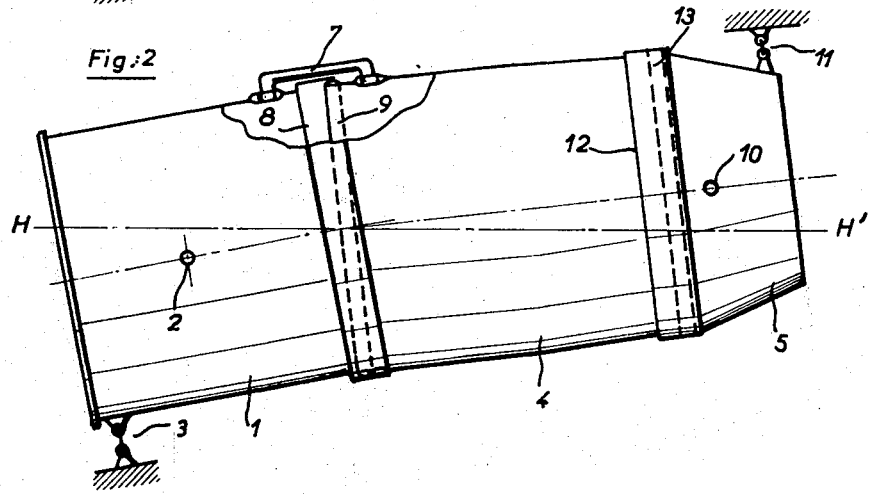
Figure 3:
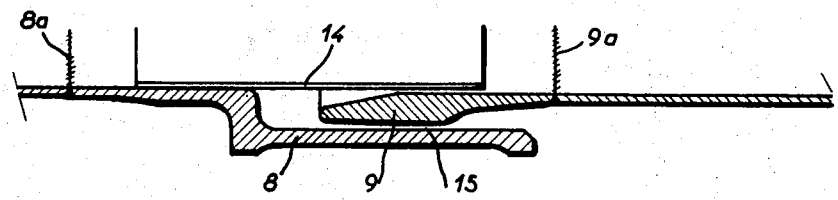

FIGS. 1, 2 and 3 show already known arrangements for mounting a jet propulsion unit in an aircraft frame. In FIG. 1, the engine 1 is attached to the airframe by an isostatic suspension indicated diagrammatically at 2, 3, whereas the jet pipe 4, rigid with the nozzle 5, is suspended at its rear, at 6, from the airframe, and at its front is centered on and coupled to the engine by means of an arm 7, being articulated on said engine by a swivel joint formed by the co-operation of the downstream flange 8 of the engine with the upstream flange 9 of the jet pipe. In FIG. 2, the jet pipe 4 is independent of the nozzle 5, which is attached to the airframe by an isostatic suspension represented diagrammatically at 10 and 11, the jet pipe 4 being articulated at its rear on the nozzle 5 by means of a second swivel joint formed by the co-operation of the downstream flange 12 of the jet pipe with the upstream flange 13 of the nozzle. FIG. 3 shows, on a larger scale, the swivel joint formed by the female flange 8 that is rigid with the engine and the male flange 9 that is rigid with the jet pipe 4. The flap 14 fills the role of a joint cover.

In both embodiments shown, the engine 1 and the jet pipe 4 are inclined downwardly towards the upstream end in relation to the horizontal plane represented by HH'. Following upon an ignition failure, the fuel, to which a certain axial velocity is initially imparted, streams along the inner wall of the jet pipe 4, passes downstream of the ball joint, slows up and, being subject to the laws of gravity, tends to fall to the lowest part of the jet pipe. Thus, when the axial velocity of the fuel in the downstream direction has reduced to zero, the fuel starts to return towards the upstream end, and therefore proceeds downwardly into the swivel joint, passes into the annular gap 15 formed between the two flanges 8 and 9 and flows towards the outside, where it should be recovered. If the stream of liquid fuel is sufficiently large, it does not all proceed downwardly into the swivel joint; a certain amount of fuel passes over the flap 14 and continues towards the upstream end, from where it must be led off. The fuel passing into the swivel joint flows at a very low speed by way of the annular gap 15 formed between the two flanges owing to the fact that these flanges have little rigidity and lie snugly the one against the other in the region of the bottom of the jet pipe due to the effect of gravity, and thereby offer great resistance to the fuel flow.

It is desirable to reduce the time taken in draining the fuel to allow a second attempt at ignition as soon as possible. The embodiment of the invention shown in FIG. 4 comprises, for this purpose, a drainage well 16, located in the lower portion of the female flange 8 upstream of the male flange 9, in the bottom of which well is arranged a drainage valve 17. This valve 17 co-operates with a seating 18 formed in the bottom of the drainage well 16. The upper face of the valve 17 is subjected to the pressure prevailing in the engine 1 and the jet pipe 4 which pressure keeps such valve closed, while the engine is running, against the action of a spring 19 attached to the female flange 8 by a screw 19a. An orifice 18a provided in the seating 18 opens into a sump formed by a dish or bowl 20 the cross-section of which extends laterally generally in the form of a circular arc. The upstream and downstream edges 20a of the dish 20 are inserted with a sliding action over ribs 21 on the female flange 8, thereby to attach the dish to such flange. The dish 20 itself opens into a recovery pipe 22.

Upon ignition, the pressure of the gases flowing inside the engine rapidly grows and soon reaches a value sufficient to close the valve 17. In the event of an ignition failure, the valve 17 remains open under the action of the spring 19 or opens again, according to the pressure value attained by the gas flow in the course of the attempt at ignition, so that the liquid fuel returning upstream, having passed underneath the flap 14 to collect in the drainage well 16, proceeds downwardly into the dish and thence into the discharge pipe 22.

In spite of the drainage valve 17, a certain amount of fuel, especially if the stream is of considerable size, may pass downstream of the male flange 9 by way of the annular gap 15. For recovering this fuel, at the downstream end of the female flange 8 is provided a transverse groove 23 the bottom of which is pierced with holes 24 that open into the dish 20. Each hole 24 has a diameter equal to the width of the groove 23 so that the fuel may fall immediately into the dish, as indicated by the arrows 25, and so prevent choking of the groove and any overflow therefrom. For safety considerations, however, a second groove 26 is provided downstream of the groove 23.

Due to the holes 24, the circular-arc shape of the dish 20 enables such dish, although it is of small thickness only, to withstand the pressure prevailing in it while the engine is running. The attaching of the dish 20 to the female flange 8, by the guideway system 20a, 21, avoids a weighty and complicated attachment means.

The device for recovering and discharging liquid fuel shown in FIGS. 4 to 6 has, more especially, the following advantages:

It avoids stagnation of fuel in the space formed by the male flange 9, the female flange 8 and the flap 14; hence fire risks are decreased;

It speeds up draining from the jet pipe 4 and allows a fresh attempt at ignition to be made as soon as possible;

The fuel flows off normally, obeying the simple laws of gravity or of capillary attraction;

The attachment of the dish is effected in a very simple manner, it is independent of the articulation between the engine and the jet pipe;

It easily withstands the pressure prevailing in the dish;

The circular-arc shape given to the dish ensures that it has the greatest resistance to pressure, with the least weight.

FIGS. 7, 8 and 9 show one embodiment of the improvement according to the invention which makes possible a reduction in leakage of gas from swivel joint such as that of the articulation 8, 9 in FIG. 1 or those of the articulations 8, 9 and 12, 13 in FIG. 2.

As has been indicated hereinbefore, these swivel joints have to operate at a high temperature of the order of 600 to 800° C. On the one hand they are subjected to the flow of hot gases inside the propulsion unit and on the other hand to the flow of by-pass air, distinctly cooler, outside such unit. The mean temperature of the joint therefore varies with various engine states and various flight conditions of the aircraft. Between the two flanges, male and female, of the swivel joint, there occurs, on the other hand, a temperature difference that is inherent in the nature of the joint, the best arrangement for this being the one that gives the least temperature difference between the two flanges, which makes possible a reduction in the thickness of the annular gap 15 between such flanges, and consequently, a reduction in the leakage of gases by way of such annular gap. From this point of view, the ideal structure of the joint, such as is necessary to affect the articulation, is a structure which most closely approaches a simple wall which does not include a joint.

If, for example, consideration is given to the swivel joint of FIG. 3, it would be possible to reduce leakages of gas by way of the annular gap 15 by observing the following principles:

A good swivel joint should have a radial thickness that is as small as possible and a length that is as short as possible;

The temperature coefficients of expansion of the materials employed for the two flanges 8 and 9 should be of the same order and should be very small. Strictly, the material of the female flange 8, which in use is the cooler, might have a coefficient of expansion slightly greater than the material of the male flange 9;

The two flanges should have the same inertia, hence, where possible, the same mass, so that their rises of temperature will occur simultaneously;

A slender swivel joint, up to a limit, strictly to allow operation with a slightly tight action, without, however, excessive effort being exerted.

Naturally a degree of initial play can be allowed between the two flanges, that is, the thickness of the annular gap 15 in the cool state can be made such that the male flange 9, which is the hotter, can expand in relation to the female flange 8. The above principles, however, allow the thickness of the annular crack 15 to be made of narrow dimension, the resulting leakage being therefore slight, and the swivel joint in FIG. 3 represents a very good solution from the point of view of reducing leakage of gases.

The fact remains, nevertheless, that the annular gap 15 continues to exist, and it is possible to improve tightness against leakages of gases by inserting a flexible sealing means between the flanges 8 and 9 downstream of such gap 15, as is shown in FIG. 7.

The swivel joint shown in said FIG. 7 resembles that in FIG. 4 and may, or may not, include a valve such as that at 17 and a dish such as that at 20 for liquid fuel recovery. The female flange 8 is extended downstream of the male flange 9 and includes at its end an annular groove 26a, analogous to the transverse groove 26 of FIG. 4 but, in the instance of FIG. 7, not employed for the recovery of liquid fuel leakages. In such annular groove 26a there is designed to be accommodated the U-shaped edge 28 of a two part ring having two identical sectors 27, 27a each with the length of a half-circumference (FIG. 8) and forming a support for the flexible sealing means. Between such support and the wall 9b, which extends the male flange 9 downstream, there are inserted (FIG. 9) two rows of small flexible plates 29, 29a arranged in staggered fashion so that they overlap one another in the direction at right angles to their junctions. These plates bear on the wall 9b, immediately downstream of the female flange 8, and by reaction press the support 27, 27a back against the female flange. When the engine is running, the pressure prevailing inside the sealing means 27, 27a, 29, 29a urges the plates and the support tightly against the wall 9b and against the female flange respectively. Such a sealing means decreases the area of possible leakage, and therefore decreases the flow of gases escaping by way of the annular gap 9. This sealing means must be flexible so as effectively to adapt itself to the surface with which it is in contact.

It will be apparent that the embodiments described are only examples and may be modified, more especially by substituting equivalent technical means, without however thereby going beyond the scope of the invention, as defined by the appended claims. In particular, instead of being urged by a spring such as that at 19, the valve 17 may be urged in the direction of opening by a counterweight or any other biasing device.

What is claimed is:

1. In an articulated joint between a first duct and a second duct forming the joining elements of an outer casing for a jet propulsion unit, which joint includes a female flange rigid with the first duct and a male flange rigid with the second duct and which fits in a portion of the famale flange to form with it the articulation of the joint, fuel recovery means adapted to discharge to the outside of the ducts any liquid fuel that may be present in the ducts after an ignition failure of the propulsion unit, comprising (a) a drainage orifice forming a valve seating located in the lowest area of the region of the female flange which is located between the first duct and that portion of the female flange penetrated by the male flange, (b) a drainage valve adapted to bear against the seating in order to close the drainage orifice by means of a pressure prevailing in the ducts, during operation of the propulsion unit, against the action of a biassing force which urges the valve in the direction of opening, and (c) a sump device located on the outside of the female flange, on the one hand communicating with the drainage orifice and on the other hand for communication with discharge means for the liquid fuel.

2. An articulated joint, according to claim 1, in which the female flange includes an extension towards the second duct, beyond that portion of the female flange which co-operates with the male flange, and such extension is pierced with holes which open into the sump device.

3. An articulated joint according to claim 2, in which the holes are pierced in the bottom of an annular groove formed in the inner surface of the extension.

4. An articulated joint according to claim 1, in which the drainage orifice is formed in the bottom of a drainage well carried by the female flange.

5. An articulated joint according to claim 1, in which the sump device is formed by a dish in the form of a sector, axial section planes of which have the configuration of generally circular arcs, said dish being provided upstream and downstream with curving edges that serve to mount the dish with a sliding action on corresponding ribs provided on the female flange.

6. An articulated joint according to claim 1, comprising flexible sealing means located between the second duct and an extension of the female flange towards the second duct beyond that portion of the female flange which cooperates with the male flange.

7. An articulated joint according to claim 6, in which the flexible sealing means is constituted by an assembly of plates applied flexibly against the second duct and against the extension respectively, and forming a concavity open to the space formed between the two flanges.

8. In an articulated joint between a first duct and a second duct forming the joining elements for the outer casing of a jet propulsion unit, which joint includes a female flange rigid with the first duct and a male flange rigid with the second duct and which fits in a portion of the female flange to form with it the articulation of the joint, fuel recovery means adapted to discharge to the outside of the ducts any liquid fuel that may be present in the ducts after an ignition failure of the propulsion unit, and flexible sealing means located between the second duct and an extension of the female flange towards the second duct beyond that portion of the female flange which co-operates with the male flange, and in which the flexible sealing means is constituted by an assembly of plates applied flexibly against the second duct and against the extension respectively, and forming a concavity open to the space formed between the two flanges, and in which the assembly of plates includes a ring which forms a support for such assembly and has a free edge adapted for location in an annular groove formed on the inner surface of the extension, and a plurality of small flexible plates arranged in a second ring which has a first edge bearing against the free edge of the support and a second edge bearing against the second duct.

9. An articulated joint according to claim 6, in which the small plates are arranged in two layers, the plates of one layer being in staggered relationship to the plates of the other layer.

10. An articulated joint according to claim 9, in which the support ring is constituted by two half-rings.

References Cited

UNITED STATES PATENTS

| | | | |
|---|---|---|---|
| 1,947,072 | 2/1934 | Walton et al. | 60—39.32 |
| 2,510,645 | 6/1950 | McMahan | 60—39.32 |
| 2,814,931 | 12/1957 | Johnson | 60—39.09 |
| 2,949,736 | 8/1960 | Rubbra | 60—39.09 X |
| 3,186,168 | 6/1965 | Ormerod | 60—39.32 |

CARLTON R. CROYLE, *Primary Examiner.*